United States Patent [19]

Brandstetter et al.

[11] Patent Number: 4,597,630

[45] Date of Patent: Jul. 1, 1986

[54] SELF-DERIVED REFERENCE BEAM HOLOGRAPHY USING A DOVE PRISM

[75] Inventors: Robert W. Brandstetter, Levittown; Otto F. Lynn, Jackson Heights; Abraham Reich, Dix Hills, all of N.Y.; Richard P. Waido, West Hartford, Conn.

[73] Assignee: Grumman Corporation, Bethpage, N.Y.

[21] Appl. No.: 45,001

[22] Filed: Jun. 4, 1979

Related U.S. Application Data

[63] Continuation of Ser. No. 790,048, Apr. 22, 1977, abandoned.

[51] Int. Cl.⁴ .................. G03H 1/12; G02B 27/10; G02B 27/46
[52] U.S. Cl. .................. 350/3.83; 350/3.68; 350/162.12; 350/170
[58] Field of Search .................. 350/3.68, 3.6, 3.83, 350/3.84, 162 SF, 170, 173, 162.12; 356/347, 348

[56] References Cited

U.S. PATENT DOCUMENTS

| | | | |
|---|---|---|---|
| 1,722,356 | 7/1929 | Romer | 350/173 |
| 1,945,029 | 1/1934 | DaPonte . | |
| 2,422,376 | 6/1947 | Turner et al. | 350/173 |
| 2,815,695 | 12/1957 | Scharf et al. | 350/173 |
| 3,357,299 | 12/1967 | Noble . | |
| 3,497,283 | 2/1970 | Law . | |
| 3,514,177 | 5/1970 | Lohmann | 350/3.68 |
| 3,537,854 | 11/1970 | Grobin et al. . | |
| 3,539,242 | 11/1970 | Burch et al. . | |
| 3,558,207 | 1/1971 | Worthington | 350/3.68 |
| 3,573,362 | 4/1971 | Burchardt . | |
| 3,694,657 | 9/1972 | Brooks | 350/162 SF |
| 3,796,476 | 3/1974 | Frosch et al. . | |
| 3,820,869 | 6/1974 | Bolusset et al. | 350/3.68 |
| 4,009,940 | 3/1977 | Ohzu | 356/113 |

OTHER PUBLICATIONS

Som et al, *Applied Physics Letters*, vol. 24, No. 12, Jun. 1974, pp. 600–602.

*Primary Examiner*—Ronald J. Stern
*Attorney, Agent, or Firm*—Morgan, Finnegan, Pine, Foley & Lee

[57] ABSTRACT

A method and associated system for providing interference patterns generated from light, including visible, ultraviolet and infrared, carrying desired information comprises the steps of and associated apparatus for modulating a light beam emanating from a suitable source, in accordance with the desired data or information or signal, splitting the modulated light beam into a pair of component beams, both thereby derived from the modulated beam, reflecting the resultant split beams towards each other so as to interfere optically. Advantageously, beam splitting and reflection may be effected by an essentially integrated, transparent element. Also advantageously, a recording of such interference is made by a positioning photosensitive medium at the point or in the plane of interference. Alternatively, an interference recording or filter may be positioned at the point or plane of optical interference, a blocking element positioned behind the splitting and reflecting element for blocking transmission of one of the split beams, and sensing apparatus positioned behind the recording on the line of transmission of the blocked beam to detect the re-occurrence of a signal corresponding to that contained on the recording.

1 Claim, 10 Drawing Figures

SELF-DERIVED REFERENCE BEAM HOLOGRAPHY USING A DOVE PRISM

This is a continuation of application Ser. No. 790,048 filed Apr. 22, 1977, now abandoned.

BACKGROUND AND OBJECTS OF THE INVENTION

The present invention relates generally to optical modulating, splitting and recording, and more particularly to methods and associated apparatus for producing optical interference patterns and interferometric recordings from light modulated with a desired signal, data or information. As hereinafter used, the term "light" shall be understood to mean all electromagnetic radiation in the light portion of the spectrum, including visible, infrared and ultraviolet light.

In many interferometric recording applications, such as holographically produced images, two coherent light beams—an object beam which is modulated with information or a signal to be recorded and a reference beam which is not modulated—are both projected at a predetermined point so as to interfere optically thereat. A photosensitive medium is located at the predetermined point for recording the resultant interference pattern, thereby forming a holographic recording or filter. The holographic recording may thereafter be reproduced by directing a reproducing beam at the filter.

Although such holographic recording devices have proved adequate for some applications, certain disadvantages arise, especially where the recording medium is mounted to apparatus, such as a moving vehicle, which is subject to vibrations. In such applications, the independently produced object and reference beams may not impinge at their corresponding points on the photosensitive medium, thereby generating an image which may not be clear. In addition, with conventional interferometric or holographic recording techniques, it is impossible to obtain a "real time" recording, especially when applied to sophisticated detection systems such as systems for identifying radio frequency signals.

It is therefore an object of the present invention to provide a new and improved method and associated apparatus for providing a pair of light beams derived from the same signal beam for optically interfering together. Another object of the present invention is to provide a new and improved method and apparatus for recording the optical interference pattern between two interfering beams. It is another object of the present invention to provide a new and improved method and apparatus for recording the optical interference pattern between two interfering beams which are derived from a single signal-carrying beam.

It is also an object of the present invention to provide a new and improved method and associated apparatus for recording the optical interference pattern between two light beams, which is substantially insensitive to mechanical vibrations.

It is a further object of the present invention to provide a new and improved method and apparatus for recording the optical interference between two light beams, which permits real time recording of the resultant interference pattern.

It is still another object of the present invention to provide a new and improved method and apparatus for recording the optical interference between two light beams, enabling the use of a limited coherence light source.

It is yet another object of the present invention to provide a new and improved method and apparatus for recording the optical interference between two light beams and identifying therefrom signals such as radio frequency signals and other electromagnetic radiation.

Objects and advantages of the invention are set forth in part herein and in part will be appreciated herefrom, or may be learned by practice with the invention, the same being realized and attained by means of the methods, steps, operations, instrumentalities, structures and combinations pointed out in the appended claims. Accordingly, the invention consists in the novel methods, structures, combinations and improvements herein shown and described.

SUMMARY OF THE INVENTION

Briefly described, the method and apparatus for splitting a modulated light beam for optical interference according to the present invention includes the steps of and associated apparatus for splitting a light beam modulated with the desired information into two modulated component beams, reflecting both component beams towards each other so as to interfere optically at a predetermined point or in a predetermined plane. Advantageously, and as here preferably embodied, the splitting and reflecting steps are carried out in an integral structure.

According to another aspect of the present invention, an improved method and apparatus for recording optical interference or identifying a particular signal comprises the steps of and associated apparatus for modulating light radiation emitted by a source of light according to the desired information to be recorded or identified, splitting the resultant modulated optical wavefront into two beams (which, for convenience, can be described as a signal beam and a a self-derived reference beam, both of which are modulated), reflecting the resultant signal and reference beams for projection towards and interference with each other in a predetermined plane, and positioning a photo-optical element essentially coincident with the predetermined plane. For recording the optical interference, the photo-optical element is a photo-sensitive medium, while, for signal identification, the photo-optical element is an interference recording of a signal to be identified. As preferably embodied, the light source is a source of generally collimated laser radiation, and the beam splitting and beam reflection is carried out by an integral structure. In addition, unmodulated light from the light source is blocked from transmission into the beam splitting means.

Advantageously, and as here preferably embodied for signal identification, one of the signal and reference beams is blocked from passing through the interference recording and a photodetector may be positioned behind the filter on line with the line of transmission of the blocked beam. Thus, when a new signal, identical to the signal represented by the interference recording, is received and operated on by the system, the un-blocked beam will be diffracted on the line of transmission of the blocked beam, whereby the photodetector is energized to indicate that the desired signal has been detected.

It will be apparent from the foregoing general description that the objects of the invention specifically enumerated herein are accomplished by the invention.

Accordingly, it has been found that the method of and associated apparatus for recording the optical interference of two light beams according to the present invention enables dynamically produced interference patterns which depend only upon changes in the spectrum and intensity of the input signal. The interference pattern is substantially insensitive to mechanical vibrations and allows use of the invention on mobile vehicles such as aircraft, seacraft, spacecraft, landcraft, etc.

It has also been found that by splitting a modulated or signal-carrying light beam to produce a recording of the optical interference pattern between the resultant split beams, a real time representation of events may be achieved. Moreover, signal recognition systems according to the present invention are capable of on-line operation. In addition, the present invention enables real-time coherent optical recordings to be made for use in the recognition of electrical emitter signals such as radio frequency (RF) signals derived from radar, IFF, black crow, EW and communication equipment. Furthermore, the signal recording and/or identification system according to the invention is much more compact and less expensive than electronic equipment intended for similar purposes, which requires a space-occupying storage medium.

The present invention may also be adapted for use in one- and two dimensional interferometric recording, on both stationary and non-stationary platforms, in such applications as real-time voice-print and face-print recordation and recognition, real-time passive acoustic and sonar signal recordation and recognition, alpha-numeric character recordation and recognition, etc.

It will be understood that the foregoing general description, as well as the following detailed description, are exemplary and explanatory of the invention, but are not restrictive thereof. Accordingly, the accompanying drawings, referred to herein and constituting a part hereof, illustrate preferred embodiments of the invention, and together with the detailed description, serve to explain the principles of the invention.

DETAILED DESCRIPTION OF PREFERRED EMBODIMENTS

Figure 1:
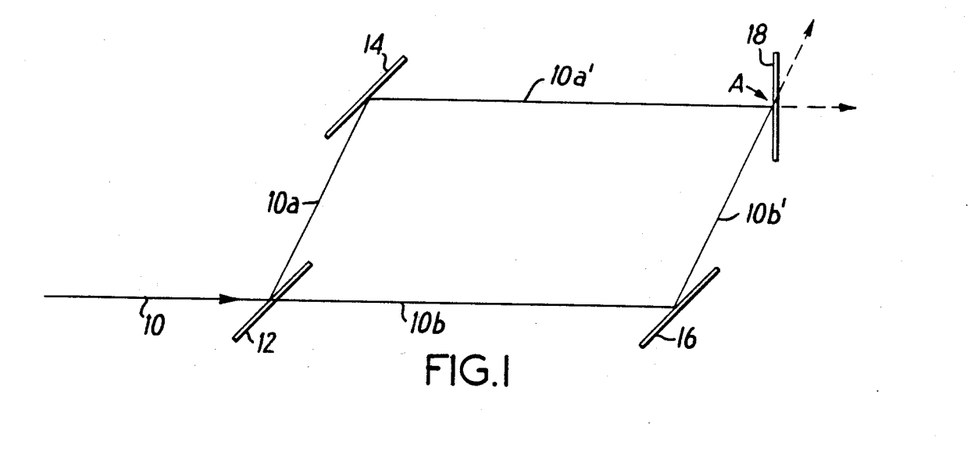
FIG. 1 is a schematic diagram illustrating the beam splitting sequence in accordance with the present invention.

Referring now to FIG. 1, there is shown a schematic diagram illustrating the sequence for generating optical interference according to the present invention. In accordance with the invention, beam 10 of light, which has been modulated or which otherwise carries data or information for recordation or identification is projected towards beam splitter 12 which is advantageously a selected beam splitter. The resultant light beams diverging from beam splitter 12—which, for convenience, can be referred to as signal beam 10a and self-derived reference beam 10b—are thence projected towards, respectively, reflecting means 14 and 16 which reflect their corresponding incident beams to generate two converging light beams, signal beam 10a' and reference beam 10b', respectively. The resultant beams 10a' and 10b' thereafter intersect and optically interfere at point A, whereat photosensitive emulsion 18, or any other suitable light sensitive recording means, is advantageously positioned for permanently recording the interference pattern generated by the intersection of the two beams 10a' and 10b'.

Figure 6:
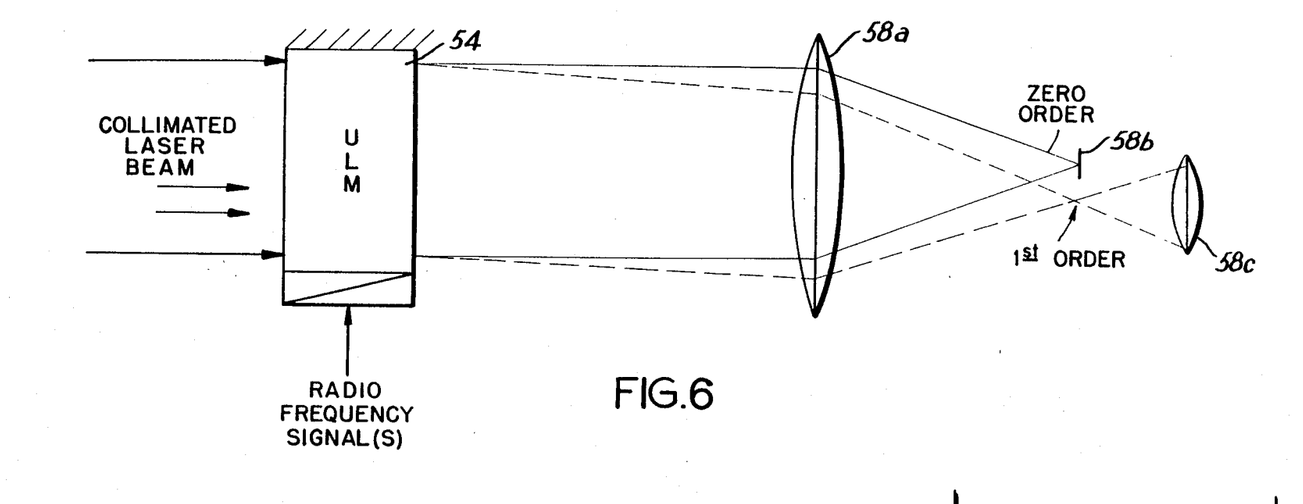
FIG. 6 is a block diagram illustrating the transform optics portion of the embodiment shown in FIG. 4.
Figure 7:
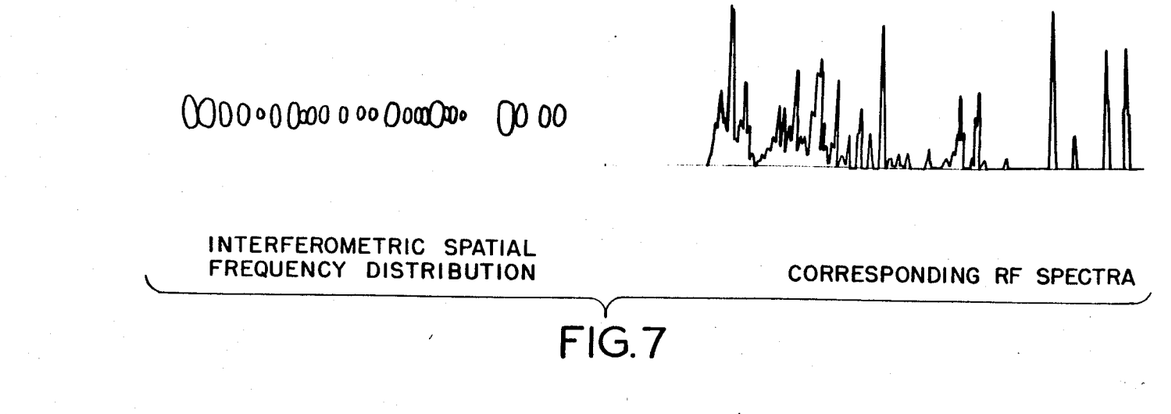
FIG. 7 is a schematic representation of an exemplary spatial frequency distribution which has been interferometrically recorded according to the present invention and the corresponding radio frequency spectra.

Playback of the interference recording, or filter, may thereafter be accomplished, for example, by projecting the same, self-derived, split and reflected beam portions at the interference recording and either blocking beam 10a' and reading the first order term (as described more fully with respect to FIG. 6) along beam 10b' or blocking beam 10b' and reading the first order term along the 10a' axis. Accordingly, it has been found that by recording the optical interference between an object light beam and a self-derived reference beam, a real-time recording may be obtained.

Figure 2:
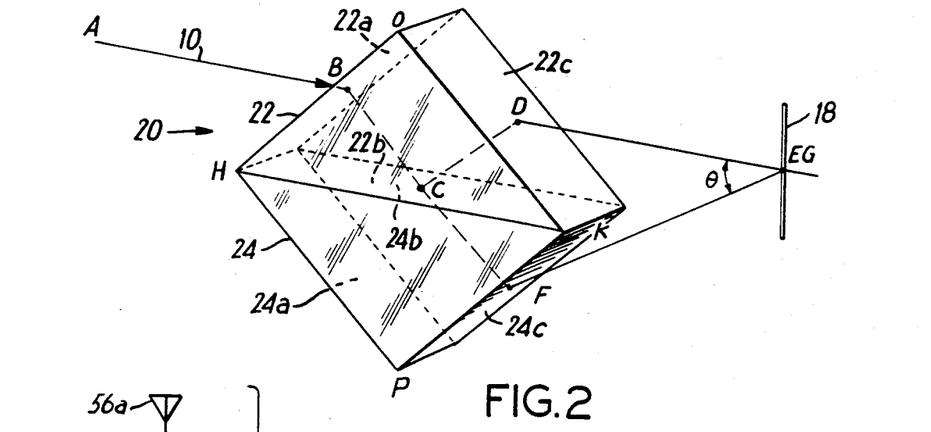
FIG. 2 is a perspective view of one embodiment of beam splitting means according to the present invention.

Referring now to FIG. 2, there is shown an embodiment of beam splitting means according to the present invention which offers particularly useful advantages over current interferometric recording techniques. According to this aspect of the present invention, beam splitting means 12 as well as reflecting means 14 and 16 may be incorporated in integral optical splitting means 20. Advantageously, splitting means 20 comprises a prism, or integrated cube, which is positioned in the path of modulated beam 10, and includes two prism elements, upper prism element 22 and lower prism element 24, which may be generally triangular in cross-section and are bonded together or secured so as to abut along their base portions, 22b and 24b, respectively, as described more fully hereinafter.

Advantageously, and as here preferably embodied, first prism element 22 is made of a substantially transparent material, such as glass, and second prism element 24 is made of another substantially transparent material which can either be the same as element 22 or have a different index of refraction from element 22, with base portions 22b and 24b abutting each other. As preferably embodied, if prisms 22 and 24 are of the same material or same index of refraction, base portions 22b and 24b may be bonded or secured together with a di-electric material therebetween, which is partially transmissive and partially reflective of the light radiation to be directed at prism means 20, according to the desired ratio of reflectance-to-refraction needed for the particular application (typically, it is about 3/1). However, prisms 22 and 24 could have indices of refraction selected for desired refraction and reflection, as more fully described hereinafter. Moreover, as a means for bonding the prisms, surfaces 22b and 24b could be made essentially perfectly flat such that by placing them against each other, or "wringing" the surfaces together, the prisms become bonded together.

In operation, the aforesaid modulated light beam 10, is made up of a quasi-collimated bundle of signal beam elements, of which beam AB is representative, each capable of generating their own corresponding optical interference patterns. Thus, beam AB is projected onto entry surface 22a of first prism element 22 whereat the incident beam is refracted at point B, due to the difference between the ambient index of refraction and that of upper prism element 22, to generate refracted beam BC. Beam BC is incident on base portion 22b, generally at about the lengthwise midpoint thereof, whereat the interface between base portions 22b and 24b function as a beam splitter, due to their different indices of refraction (or due to the presence of the di-electric coating if both prisms have identical indices), generating divergent beams CD (the signal beam corresponding to beam 10a of FIG. 1) and CF (the self-derived reference beam corresponding to beams 10b of FIG. 1). Signal beam CD is thence reflected toward exit surface 22c of prism 22, whereat it is refracted, at point D, to generate exit signal beam DE (corresponding to beam 10a' of FIG. 1), while reference beam CF is directed towards exit surface 24c of prism 24, whereat it is refracted, at point F, to generate exit reference beam FG (corresponding to beam 10b' of FIG. 1). The resultant exit beams DE and FG emanate from beam splitting means 20 so as to form interference recording angle $\theta$ with respect to each other, intersecting and interfering at point EG whereat photosensitive emulsion 18 (sensitive to the particular wavelength of light 10) is positioned to record the interference pattern.

According to this aspect of the present invention, not only does integral beam splitting means 20 enable real time recording of optical phenomena but, due to the stability of the controlled optical medium provided by the integrated cube, it also enables interferometric recording which is essentially insensitive to mechanical vibrations. In addition, since beam ABC represents the full signal beam portion to be recorded, the beam splitting means according to the present invention enables the optical path lengths of the reference and signal beams, i.e., CDE and CFG, to be equalized, thereby permitting the use of light sources of limited coherence length, such as simple laser generating devices, to minimize costs.

Figure 3A:
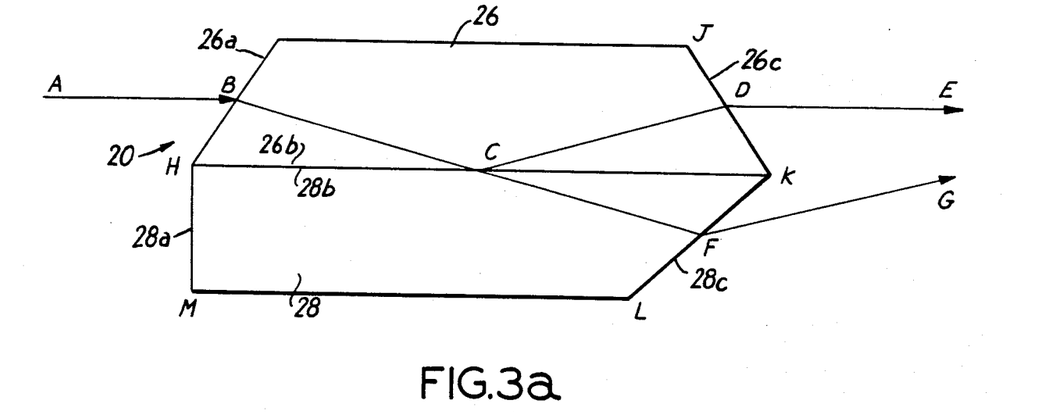
FIGS. 3a-d are sectional views of alternate embodiments of integral beam splitting means according to the present invention.

Referring now to FIG. 3a, there is shown a side view of another embodiment of integral beam splitting means according to the present invention. According to this aspect of the present invention, integrated cube 20 includes generally trapezoidal dove prism 26 which is bonded along its base surface 26b to another generally trapezoidal prism 28 along its base surface 28b, substantially as described hereinbefore, with the materials making up prisms 26 and 28 related in the same way as those making up prisms 22 and 24 described with reference to FIG. 2. Advantageously, and as here preferably embodied, the angle defined between exit surface 26c and its base surface 26b of upper prism 26 is about the same as or only slightly greater than that defined between exit surface 28c and base surface 28b of lower prism 28.

The embodiment illustrated in FIG. 3a operates in essentially the same manner as the device described above with reference to FIG. 2. This embodiment, as well as those shown in FIGS. 2, 3c and d is particularly suited for one-dimensional input signals since signal beam ABCDE is inverted (by virtue of its single reflection) with respect to the self-derived reference beam ABCFG. However, although these embodiments do not function optimally for two-dimensional input signals, they do enable significant reduction in optical noise when used in such applications.

In addition, it will be apparent to those skilled in the art that for a given incident polarization and a given set of angles and refractive indices, the polarizations and relative intensities of the emerging upper and lower rays are given by the commonly known Fresnel formulas and their converging angle is determined by Snell's law of refraction, as will be discussed more fully hereinafter. Moreover, for optimum interference effects, the sigma and pi polarizations defined at the surface where the whole modulated beam is incident are the eigenpolarizations.

Figure 3B:
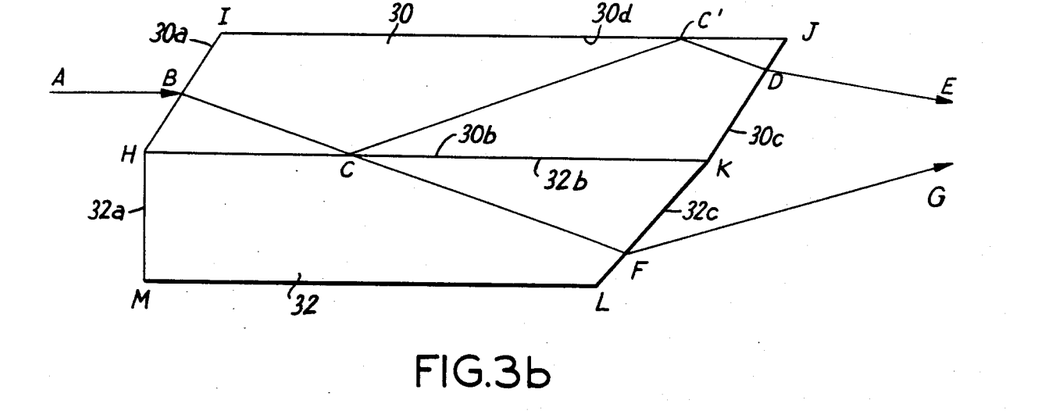

Referring now to FIG. 3b, there is shown a side view of another embodiment of beam splitting means according to the present invention, which is particularly useful in the interferometric recording of two-dimensional optical input signals. According to this aspect of the present invention, upper prism 30 consists of a rhomboidal prism and lower prism 32 may be generally the same trapezoidal prism as prism 28 described above with reference to FIG. 3a. In addition, the characteristics of the materials making up the two prisms may be essentially the same as described above with reference to FIGS. 2 and 3a.

In operation, the information-bearing beam AB is incident on surface 30a of upper prisms 30 and is refracted towards its base surface 30b where it impinges at point C thereon. The beam is then reflected (beam CC') and refracted (beam CF) at point C which, unlike the previously described embodiments of FIGS. 2 and 3a, is not at about the midpoint of surface 30a.

The reflected signal beam CC' is thence reflected off upper surface 30d whereby it is re-inverted and subsequently exits at point D from surface 30c to produce signal beam DE directed at interferometric recording medium 18. Simultaneously, refracted beam CF in the lower prism impinges upon surface 32c thereof to produce the self-derived reference beam FG for interference, which is directed toward the path of beam DE for optically interfering therewith. It will be understood that any convenient means may be employed for generating a double reflection of beam ABCC'DE, such as, for example, elongating upper prism 30, or manipulating the relative indices of refraction between the ambient atmosphere and upper prism 30.

Since beams ABCC'DE and ABCFG are not inverted with respect to each other, this embodiment of beam splitting means according to the present invention may be employed for interferometric recordings of both one- and two-dimensional signal inputs. However, although this embodiment operates satisfactorily for two-dimensional input signals, it does not provide the significant optical noise reduction as does the embodiment shown in FIGS. 2 and 3a.

Figure 3C:
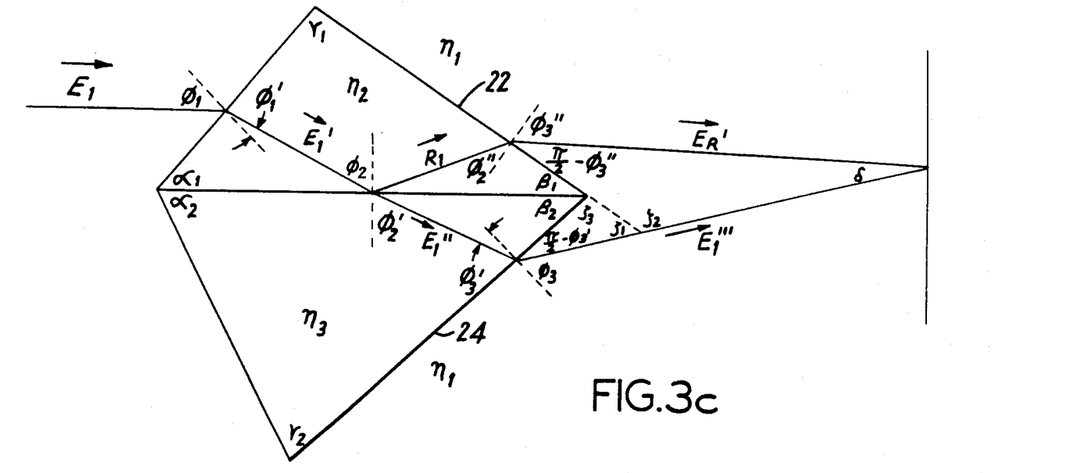

Referring then to FIG. 3c, there is shown a general embodiment of beam splitting means according to the present invention in order to illustrate exemplary determination of angular relationships. According to this embodiment, the integrated interference "cube" includes two triangular prisms 22 and 24, which are bonded together as set forth more fully hereinbefore. Upper prism 22 is formed with apex angle $\gamma_1$ and base angles $\alpha_1$ and $\beta_1$. Likewise, lower prism 24 is formed with apex angle $\gamma_2$ and base angles $\alpha_2$ and $\beta_2$, the index of refraction of the ambient atmosphere surrounding the cube is denoted by $n_1$ and those of prisms 22 and 24 are, respectively, $n_2$ and $n_3$. The incident laser beam portion is represented by vector $E_1$ and the various refracted and reflected portions thereof are represented by vectors $E_1'$, $E_1''$, $R_1$, $E_1'''$ and $\vec{E}_R$, the latter two beam portions intersecting on interference plane 6 and forming interference angle $\sigma$.

By Snell's law, $$n_1 \sin \phi_1 = n_2 \sin \phi_1' \tag{1}$$

$$n_2 \sin \phi_2 = n_3 \sin \phi_2' \tag{2}$$

$$n_3 \sin \phi_3 = n_1 \sin \phi_3' \tag{3}$$

and $$n_2 \sin \phi_2'' = n_1 \sin \phi_3'' \tag{4}$$

Moreover, by inspection, $$\phi_2 = \phi_1' + \alpha_1 \tag{5}$$

$$\phi_3 = \phi_2' - \beta_2, \tag{6}$$

$$\phi_2'' = \phi_2 - \beta_1 \tag{7}$$

$$\rho_3 = \pi - (\beta_1 + \beta_2) \tag{8}$$

$$\rho_2 = \rho_3 + \left(\frac{\pi}{2} - \phi_3'\right). \tag{9}$$

Substituting, therefore, for $\rho_3$, $$\rho_2 = \frac{3\pi}{2} - (\beta_1 + \beta_2) - \phi_3' \tag{10}$$

In addition, since $$\pi = \sigma + \left(\frac{\pi}{2} - \phi_3''\right) + \rho_2, \tag{11}$$

$$\sigma = \phi_3'' + \phi_3' + (\beta_1 + \beta_2) - \pi \tag{12}$$

From (1), $\phi_1' = \sin^{-1}\left[\frac{n_1}{n_2} \sin \phi_1\right]$ \tag{13} and substituting (5) into (7) and (13)

$$\phi_2'' = \phi_1' + \alpha_1 - \beta_1 \tag{14}$$

and $$\phi_2'' = \sin^{-1}\left[\frac{n_1}{n_2} \sin \phi_1\right] + \alpha_1 - \beta_1 \tag{15}$$

and combining with (4)

$$\sin \phi_3'' = \frac{n_2}{n_1} \sin\left\{\sin^{-1}\left[\frac{n_1}{n_2} \sin \phi_1\right] + \alpha_1 - \beta_1\right\} \tag{16}$$

From similar computations based upon equations (2), (3), (5) and (6), $$\sin \phi_3' = \frac{n_3}{n_1} \sin\left\{\sin^{-1}\left[\frac{n_2}{n_3} \sin\left(\sin^{-1}\left(\frac{n_1}{n_2} \sin \phi_1\right) + \alpha_1\right)\right] - \beta_2\right\} \tag{17}$$

Knowing the various angles of reflection and refraction at the boundary points or points of incidence for each ray (based upon Snell's law and the law of reflection discussed hereinbefore), the magnitude and phase of each electric field vector (i.e., $\vec{E}_1$, $\vec{E}_1'$, $\vec{E}_1''$, $\vec{R}_1$, $\vec{E}_R'$ and $\vec{E}_1'''$) can be determined from Fresnel's law of reflection, discussed in Jenkens & White, *Fundamentals of Optics*, (Third Edition 1957) at p. 510. Since the reflected component at the entry point of beam $E_1$ and at the exit points for beams $E_R'$ and $E_1'''$ can be made negligible, such as, for example, by applying anti-reflective coatings on the appropriate surfaces, the only reflected ray occurs at the point of incidence of ray $E_1'$ on the inter-prism surface. Thus, illustrative calculations using Fresnel's law can be taken at such point, as follows (the subscript "s" indicating the polarization term perpendicular to the plane of incidence and the subscript "p" indicating the parallel term):

$$R_{1S} = -E_{1S'} \frac{\sin(\phi_2 - \phi_2')}{\sin(\phi_2 + \phi_2')} \tag{18}$$

$$E_{1S}'' = 2 E_{1S'} \frac{\sin\phi_2' \cos\phi_2}{\sin(\phi_2 + \phi_2')} \tag{19}$$

$$R_{1P} = E_{1P'} \frac{\tan(\phi_2 - \phi_2')}{\tan(\phi_2 + \phi_2')} \tag{20}$$

$$E_{1P}'' = \frac{2 E_{1P'} \sin \phi_2' \cos \phi_2}{\sin(\phi_2 + \phi_2') \cos(\phi_2 - \phi_2')}, \tag{21}$$

Figure 3D:
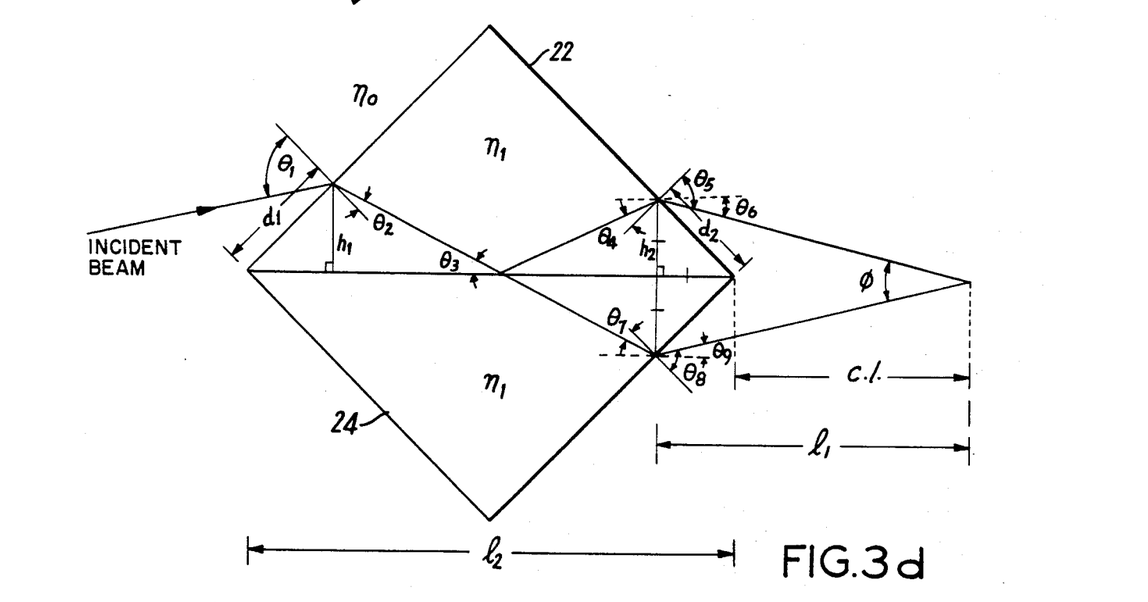

Referring now to FIG. 3d, there is illustrated a particularly useful embodiment of integrated beam splitting means according to the present invention, which will also serve to illustrate determination of the angular and linear relationships for any embodiment of the present invention. According to this embodiment, the integrated interference "cube" is comprised of two right triangular prisms, 22 and 24, each having an apex angle of 90° and base angles of 45°. The indices of refraction of prisms 22 and 24 are equal and they are joined or bonded at their bases with a non-refracting dielectric material therebetween, which is characterized by reflectance R and transmittance T, both being non-zero.

By Snell's law, $$n_0 \sin \theta_1 = n_1 \sin \theta_2, \text{ and} \tag{22}$$

$$\theta_2 = \sin^{-1}\left(\frac{n_0}{n_1} \sin \theta_1\right).$$

Moreover, from examination of FIG. 1, it is clear that $$\theta_3 = 45° - \theta_2;$$

$$\theta_4 = 90° - \theta_3 - 45°.$$

Therefore, $$\theta_4 = \theta_2 \qquad (23)$$

Again, using Snell's law $$\theta_5 = \sin^{-1}\left(\frac{n_1}{n_0} \sin \theta_4\right). \qquad (24)$$

Substituting from equation (23), $$\theta_5 = \sin^{-1}\left(\frac{n_1}{n_0} \sin \theta_2\right); \text{ and therefore} \qquad (25)$$

$$\therefore \theta_5 = \theta_1$$

In addition, since $$\begin{aligned}45° - \theta_6 &= 90° - \theta_5, \\ \theta_6 &= \theta_5 - 45°; \text{ and} \\ \therefore \theta_6 &= \theta_1 - 45°\end{aligned} \qquad (26)$$

By examination of FIG. 3d, it is also clear that $$\theta_7 = \theta_2;$$

and $$\theta_8 = \theta_1.$$

Therefore, similar to the analysis above with respect to $\theta_6$, $$\theta_9 = \theta_1 - 45° \qquad (27)$$

In addition, from examining FIG. 3d, $$\phi = \theta_6 + \theta_9.$$

Substituting equations (26) and (27), $$\begin{aligned}\phi &= \theta_1 - 45° + \theta_1 - 45°; \\ \therefore \phi &= 2\theta_1 - 90°\end{aligned} \qquad (28)$$

The relationship expressed in equation (28) clearly indicates that the convergence angle of this embodiment depends only upon the incidence angle of the beam, i.e., angle $\theta_1$. Accordingly, since, for the output beams to converge, $\theta$ must be positive, $\theta_1$ must be between 45° and 90°. If $\theta_1$, is less than 45°, $\phi$ is negative and the two resultant beams diverge. Moreover, at an incidence angle of 45°, $\phi$ will be zero and the two resultant beams will be parallel.

Turning now to a derivation of the convergence length (C.L.), by inspection of FIG. 3d, it is clear that $$C.L. = l_1 - h_2 \qquad (29)$$

Thus, since $$l_1 = \frac{h_2}{\tan(\phi/2)}, \qquad (30)$$

then $$C.L. = h_2 \frac{1}{\tan \phi/2} - 1 \qquad (31)$$

Furthermore, since $$d_2 = \frac{h_2}{\sin 45°} = \frac{2h_2}{\sqrt{2}}, \qquad (32)$$

then $$h_2 = \frac{d_2 \sqrt{2}}{2} \qquad (33)$$

Substituting equation (33) into equation (31), $$C.L. = \frac{d_2 \sqrt{2}}{2} \frac{1}{\tan \phi/2} - 1 \qquad (34)$$

Accordingly, substituting Equation (28) into Equation (34), $$C.L. = \frac{\sqrt{2}}{2} \times d_2 \left[\frac{1}{\tan(\theta_1 - 45°)} - 1\right] \qquad (35)$$

From the foregoing, it will be readily apparent to those skilled in the art that the convergence length and the convergence angle can be computed for any embodiment, based upon Snell's law and other appropriate geometric/optical relations.

Figure 4:
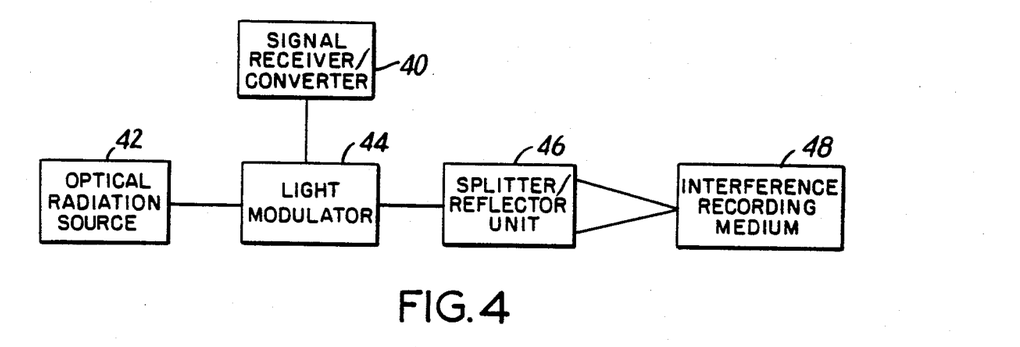
FIG. 4 is a block diagram illustrating one embodiment of apparatus for recording an optical interference pattern according to the present invention.

Referring now to FIG. 4, there is shown a block diagram of a real-time optical interference and recordation system according to the present invention for recording and/or identifying an object signal. In general, this system may be adapted for such applications as electrical signal recordation and recognition systems, including, for example, the radio frequency signal recognition system hereinafter described with reference to FIG. 5, voice-print recognition systems, alphanumeric character recognition, etc.

Accoring to the embodiments shown in FIG. 4, the object signal recordation system comprises signal receiving section 40 adapted to receive the object signal to be recorded and/or analyzed, optical radiation source 42 adapted to provide a collimated beam of light, and light modulator 44 for modulating the resultant light from optical source 42 in accordance with the characteristics of or information contained by the object signal received by receiving section 40. It will be understood that receiving section 40 may be adapted to receive any desired object signal, such as, for example, electromagnetic radiation, acoustical waves, optical radiation, etc. Thus, where appropriate, receiving section 40 may include transducer means for converting the received object signal into a form compatible with light modulator 44 for modulating the optical input from source 42.

The resultant modulated light signal from modulator 44 may thence be split and reflected substantially as discussed above with respect to FIG. 1, preferably by directing the modulated beam at an entry surface of one of the embodiments of the beam splitting means (indicated generally at 46) described above with reference to FIGS. 2 or 3(a)-(d) for real-time interferometric recordation of the information associated with the object signal. As here embodied, splitting means 46 comprises a pair of 45°-90°-45° prisms both made of the same optical quality glass with a thin di-electric layer of oil (sold under the trade designation of "ESSO Univolt 33") between the two held-together prisms to provide a reflectance-to-refraction ratio of about 3/1.

Thereafter, the resultant reference and object beams from integrated splitter 46 are projected for optical interference, as described more fully hereinbefore, and recordation on interference filter 48 (substantially identical to photosensitive emulsion 18 described above with respect to FIG. 1). It will be understood by those skilled in the art that the photosensitive emulsion will be sensitive to the particular wavelength of light used for a prescribed period of time in order to record the desired signal information. Thus, for example, if a pulse signal is desired or anticipated, the photosensitive medium may simply stand ready until the signal occurs. Since the radiation from source 42 is unmodulated and therefore a continuous zero-order beam (see the discussion herein with respect to FIG. 6), no light radiation is passed on until a signal is detected. However, where a continuous signal is anticipated, means, such as a shutter-like member, may be utilized to limit the time the photosensitive emulsion is exposed.

Figure 5:
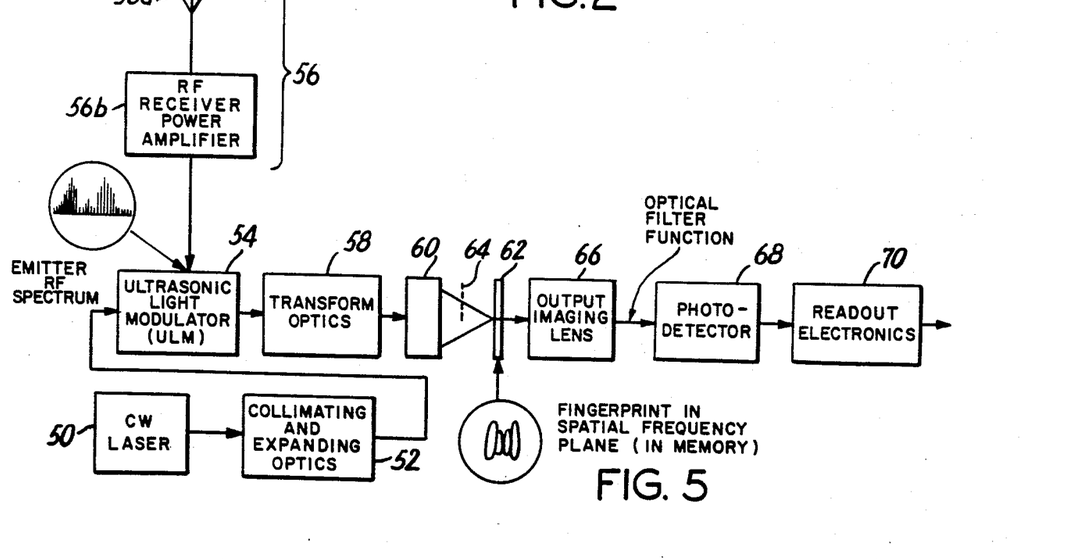
FIG. 5 is a block diagram illustrating a preferred embodiment of a signal recognition system according to the present invention.

Referring now to FIG. 5, there is shown a block diagram of a real-time electrical signal recognition system according to the present invention, which is particularly useful in radio frequency (RF) signal recognition. According to this aspect of the present invention, the RF signal analysis system includes a light source 50, advantageously a continuous wave laser source, having its output projected into beam collimating and expanding optical system 52 which shapes the laser radiation appropriately for compatibility with the remainder of the system. Thus, for example, laser source 50 may be a plane polarized helium cadmium device and system 52 advantageously includes a half-wave plate for rotating the polarization axis for the most favorable entrance conditions for the beam expanding means which, here, is adapted to expand the laser beam 10 generated by source 52 along one axis to correspond to the rectangular "window" of light modulator 54, described more fully hereinafter.

The output of optical system 52 is thence projected into light modulator 54, which is also fed with the output of signal receiving section 56. Advantageously, light modulator 54 includes a driver element which acts as a transducer to convert the received signals received by receiving section 56 into acoustical signals, and a delay element providing the medium through which the acoustic wave is launched to the light beam. Thus, for a radio frequency signal identification system, the driver element may be a piezoelectric or a magnetostrictive element, while the delay element in any system should be transparent to the particular light beam utilized, non-dispersive and have a homogeneous refractive index. As here embodied, for a laser source 52, the driver element may be a generally flat piezo-electric crystal and the delay element may be a quartz crystal attached thereto and through which laser beam 10 is transmitted.

As here embodied, signal receiving system 56 comprises antenna 56a for picking-up the radio frequency signals and power amplifier 56b for raising the radio signal received by antenna 56a to an appropriate level for introduction into ultrasonic light modulator 54 which modulates the collimated light from optical system 52 in accordance with the characteristics of the received radio frequency signal. Thus, modulator 54 provides an optically modulated frequency distribution corresponding to the frequency distribution of the incoming RF signal. Advantageously, a filter and pre-amplifier may also be interposed between the antenna and amplifier 56b for filtering out signals outside the desired or anticipated band and pre-amplifying the received RF signal.

The resultant modulated light from modulator 54 is thence projected into optical system 58 for allowing only the modulated light beam to be transmitted further. To this end, the resultant beam from modulator 54, which contains zero-order (or unmodulated) beam element and first order (modulated) beam element, is preferably subject to the transformation lens system illustrated in FIG. 6. Accordingly, due to the divergence between the zero and first order portions, since the first order beam element is diffracted by modulator 54 at an angle proportional to the modulating radio frequency, the modulated beam can be focused through lens 58a with blocking means 58b positioned at the back focal point of lens 58a to block further transmission of the zero-order, or unmodulated, beam element. Thereafter, the first order beam element can pass to imaging lens 58c, positioned in front of lens 58a by a distance equal to the focal length of lens 58a, in order to collimate the first order beam element. Accordingly, the first order beam element which carries the optically modulated frequency distribution corresponding to the RF spectrum is re-focused into a generally collimated beam of light rays for subsequent processing as hereinafter described.

Referring back to FIG. 5, the resultant light from imaging lens 58c is thence directed towards beam splitting means 60 which, advantageously, may be any of the beam splitting means described above with reference to FIGS. 1, 2 or 3a-d, to provide an RF signal recognition system which is substantially insensitive to mechanical vibrations.

The resultant self-derived signal and reference beams from beam splitter 60 are both directed at interference recording medium 62 (similar to photosensitive emulsion 18 described above with reference to FIGS. 1 and 2) for producing an optical interference recording, including both the density and interferometric structure of the split, modulated beam. As here embodied, recording medium 62 is a photopolymer sensitive to light in the laser spectrum.

For playback, the interference recording, or filter, may be illuminated by any suitable projection technique adapted for use with phase recordings, such as the schlierin technique. However, as preferably embodied, the playback means may form part of the optical interference recording system for real time and on-line radio frequency signal recognition.

To this end, the system may include optical block means 64 adapted for insertion in the path of the self-derived reference beam and photo-detector 68 positioned on the line of transmission of the self-derived reference beam and read-out electronics equipment (indicated generally by reference number 70) which may be any convenient indicating device such as an alarm, a CRT, TV camera or the like, for indicating that the desired signal has been received. In addition, imaging lens system 66 may be included between interference filter 62 (now a recording of the previous optical interference) and photo-detector 68 for more sharply defining the resultant beam from filter 62 for optimizing detection by photo-detector 68.

In operation, for example, when it is desired to detect the re-occurrence of a particular radio frequency signal, an interference filter corresponding to that frequency is positioned at 62 in FIG. 5. The system elements 50–60 operate as described above, with receiving means 56 receiving the various radio frequency signals transmitted through the air. Each signal is introduced to modulator 54 for modulating the light radiation produced by light source system 50–52 for projection on splitting means 60. Thereafter, block means 64 is introduced in the path of the self-derived reference beam (beam 10a in FIG. 1) such that only the signal beam is projected at the interference recording.

If the received signal, as represented by the unblocked signal beam, is not the same as that recorded on the interference recording, it will pass straight through the filter, generally without being diffracted. However, when the signal received by receiving section 56 is the same as the one represented on the interference recording, the unblocked beam emanating from splitting means 60 will be diffracted along the line of transmission of the blocked beam. Thus, it will be diffracted so as to be incident upon photo-detector 68 which is triggered thereby to activate any appropriate indicating device 70.

In a particularly useful embodiment, photo-detector 68 may be of the scanning variety, such as a vidicon to scan the signal beam transmitted through the interference filter, and couple the detected inputs to a suitable television viewing screen for viewing the detected radio frequency signal. In addition, output imaging lens 66 is advantageously selected to provide a resultant interference filter output image, or optical filter function, suitable for detection by detector 68. It will be understood that any suitable lens system may be utilized, which is adapted to accommodate any particular set of distance and magnification constraints on the system, such as, for example, the allowable throw (i.e., the distance from interference filter 62 to the incident plane of photo-detector 68), the necessary magnification (as determined by the size of the detecting surface of detector 68), and the size of the lens system needed to accept the entire beam of quasi-collimated light transmitted through the interference filter, etc.

Thus, given such system restrictions, a specific lens system can be designed by using the Gauss Lens Equations for positioning the lens element(s) in system 66 and thereafter adjusting for any imperfections or aberrations in the lens(es). Thus, for a given throw distance and a given magnification factor, (as determined by the ratio of the corresponding object size of interference filter 62 and the image plane of detector 68), a general two lens problem can be formulated and solved. For example, for a throw of 200 mm. and a magnification of −0.46 (an object image of 23.5 mm. on the interference filter corresponding to 10.8 mm. in the image plane of detector 68), a 105 mm. lens can be positioned about 108.5 mm. in front of the plane of interference filter 62 and a 50 mm. lens can be positioned about 44.1 mm. in front of the first lens. However, it will be understood that the computations herein are merely illustrative and that the particulars of lens system 66 will be dependent upon other parameters in the overall signal recognition system.

It will be understood by those skilled in the art that the invention in its broader aspects is thus not limited to the specific embodiments herein shown and described, but variations may be made therefrom without departing from the scope and spirit of the invention, as defined in the accompanying claims, and without sacrificing its principal advantages.

What is claimed is:

1. A system for use in recordation and recognition of signal information from such signals as acoustical waves, electromagnetic waves and like signals capable of being used to modulate light, comprising:

a source of light radiation;

receiving means for receiving desired signal information;

modulating means adapted to receive the light provided by said light radiation source, said modulating means adapted to modulate at least a portion of light from said light source in accordance with the desired signal information to be recorded or recognized;

optical means for allowing only modulated light radiation to be transmitted thereby;

beam-splitting means for splitting said modulated object beam into a signal and a corresponding self-derived reference beam, said beam-splitting means including:

a first transparent prism element having a first essentially flat incident surface, a first base surface and a first exit surface, the index of refraction of said first prism and the orientation of said first incident surface with respect to said base surface and object beam being selected to refract the object beam, when incident on said first incident surface, towards said first base surface whereat the once refracted object beam in part is reflected towards said first exit surface which is oriented to refract the reflected beam portion towards a predetermined plane to form said signal beam and in part is transmitted through said first base surface, said first prism comprising an isoselese trapezoidal dove prism having equal base angles along said first base surface; and a second transparent prism having a second base surface abutting said first base surface and a second exit surface, said second base surface and said second exit surface forming an angle smaller than the base angle of said first prism element, the interface of said first and second base surfaces being adapted to split the object signal beam into the reflected beam portion which is reflected towards said first exit surface and a transmitted beam portion which is transmitted into said second prism, the index of refraction of said second prism and the orientation of said second exit surface relative to said second base surface being selected to refract the transmitted beam portion towards said second exit surface which in turn refracts the transmitted beam portion towards the path of the signal beam to form said reference beam and to interfere optically with the signal beam at the predetermined plane, said first and second prisms being coupled together to form an essentially integral beam-splitting means which is virtually unaffected by mechanical vibrations; and a photo-optical element positioned essentially at the location of optical interference between said signal and reference beams.

* * * * *

UNITED STATES PATENT AND TRADEMARK OFFICE
CERTIFICATE OF CORRECTION

PATENT NO.   :   4,597,630

DATED        :   July 1, 1986

INVENTOR(S)  :   Robert W. Brandstetter, et al.

It is certified that error appears in the above-identified patent and that said Letters Patent is hereby corrected as shown below:

Page 1, [73] Assignee, "Grumman Corporation" should read --

Grumman Aerospace Corporation--.

Signed and Sealed this

Fifteenth Day of September, 1987

Attest:

DONALD J. QUIGG

*Attesting Officer*  *Commissioner of Patents and Trademarks*